(12) United States Patent
Jin

(10) Patent No.: US 9,715,830 B2
(45) Date of Patent: Jul. 25, 2017

(54) APPARATUS FOR ASSISTING IN LANE CHANGE AND OPERATING METHOD THEREOF

(71) Applicant: HYUNDAI MOBIS Co., Ltd., Yongin-si, Gyeonggi-do (KR)

(72) Inventor: Soon Jong Jin, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 302 days.

(21) Appl. No.: 14/518,031

(22) Filed: Oct. 20, 2014

(65) Prior Publication Data
US 2015/0194057 A1 Jul. 9, 2015

(30) Foreign Application Priority Data
Jan. 3, 2014 (KR) .................. 10-2014-0000604

(51) Int. Cl.
| | | |
|---|---|---|
| *G08G 1/16* | (2006.01) | |
| *B60Q 9/00* | (2006.01) | |
| *G06K 9/00* | (2006.01) | |
| *B60R 1/00* | (2006.01) | |
| *B62D 15/02* | (2006.01) | |
| *B60W 30/12* | (2006.01) | |
| *G06K 9/32* | (2006.01) | |
| *G06K 9/46* | (2006.01) | |

(52) U.S. Cl.
CPC ............ *G08G 1/167* (2013.01); *B60W 30/12* (2013.01); *B62D 15/029* (2013.01); *B62D 15/0255* (2013.01); *G06K 9/00798* (2013.01); *G06K 9/3241* (2013.01); *G06K 9/4638* (2013.01)

(58) Field of Classification Search
None
See application file for complete search history.

(56) References Cited

U.S. PATENT DOCUMENTS 6,226,592 B1 * 5/2001 Luckscheiter ....... B62D 15/025
180/411
9,623,876 B1 * 4/2017 Slusar .................. B60W 40/09
(Continued)

FOREIGN PATENT DOCUMENTS

| CN | 101811502 A | 8/2010 |
|---|---|---|
| CN | 102208019 A | 10/2011 |
| KR | 10-0882687 B1 | 2/2009 |

OTHER PUBLICATIONS

Sep. 2, 2016, Chinese Office Action for related CN application No. 201410638331.8.

*Primary Examiner* — Mohammad J Rahman
(74) *Attorney, Agent, or Firm* — Paratus Law Group, PLLC

(57) ABSTRACT

Disclosed are an apparatus for assisting in a lane change and an operating method thereof. The apparatus includes a driving information collecting unit, an image generating unit, a line detecting unit, a lane change determination unit, and a danger determining unit. The apparatus calculates a danger of an accident based on an image photographed by a camera and notifies a driver of the danger of the accident in advance when two or more vehicles, which are travelling with one lane interposed therebetween, simultaneously change lanes toward the same lane, thereby enabling a driver of a vehicle to be safe according to a lane change before the driver actually changes the lane.

19 Claims, 8 Drawing Sheets

(56) References Cited

U.S. PATENT DOCUMENTS

| | | | |
|---|---|---|---|
| 2004/0016870 A1* | 1/2004 | Pawlicki | H04N 5/247 |
| | | | 250/208.1 |
| 2008/0230297 A1* | 9/2008 | Lee | B60W 40/08 |
| | | | 180/271 |
| 2008/0291000 A1 | 11/2008 | Kim et al. | |
| 2009/0058622 A1* | 3/2009 | Hsieh | B60Q 9/008 |
| | | | 340/435 |
| 2009/0088925 A1* | 4/2009 | Sugawara | B60W 30/12 |
| | | | 701/41 |
| 2010/0138115 A1* | 6/2010 | Kageyama | B60R 21/0134 |
| | | | 701/46 |
| 2013/0096767 A1* | 4/2013 | Rentschler | B60W 30/12 |
| | | | 701/28 |
| 2013/0166150 A1* | 6/2013 | Han | B60W 10/18 |
| | | | 701/42 |
| 2014/0285364 A1* | 9/2014 | Chen | G08G 1/167 |
| | | | 340/988 |
| 2016/0231746 A1* | 8/2016 | Hazelton | G05D 1/0212 |
| 2017/0032677 A1* | 2/2017 | Seo | G08G 1/167 |

* cited by examiner

APPARATUS FOR ASSISTING IN LANE CHANGE AND OPERATING METHOD THEREOF

CROSS-REFERENCE TO RELATED APPLICATIONS

The present application claims priority to Korean Patent Application Number 10-2014-0000604 filed Jan. 3, 2014, the entire contents of which the application is incorporated herein for all purposes by this reference.

TECHNICAL FIELD

The present invention relates to an apparatus for assisting in a lane change and an operating method thereof, and more particularly, to an apparatus for assisting in a lane change, which, when a driver desires to change a driving lane of a vehicle, detects whether another vehicle moves to a lane, to which the driver desires to move the vehicle, based on an image photographed by a camera, and notifies the driver of a danger according to the lane change in advance, and an operating method thereof.

BACKGROUND

A currently suggested driving assisting apparatus includes a front side assisting apparatus for a vehicle and a rear side monitoring apparatus for a vehicle. Here, a rear side assisting apparatus for a vehicle is an apparatus installed for preventing a minor collision between a rear object existing in a field of view, that is, a blind spot, which cannot be confirmed through a room mirror or a side mirror when a driver reverses a vehicle, and a vehicle. That is, the rear side assisting apparatus for a vehicle is an apparatus for detecting a rear object, and generating an alarm when a distance between the detected rear object and the vehicle is within a predetermined distance. Further, similar to the rear side assisting apparatus for a vehicle, the front side assisting apparatus for a vehicle is an apparatus for detecting a front object, and generating an alarm when a distance between the detected front object and the vehicle is within a predetermined distance.

However, research on an apparatus, to which a technique for assisting in a lane change while a vehicle travels is applied, considering a currently suggested driving assisting apparatus is inadequate. Particularly, a field view problem generated due to a lane change while the vehicle travels has a considerably higher risk of an accident than a field view problem generable at a front side and a rear side of the vehicle. Accordingly, a technique for assisting in a lane change while a vehicle travels, and notifying a driver of a danger according to the lane change in advance has been needed.

In the meantime, a technique for detecting an obstacle existing on a driving lane of a vehicle has been disclosed as a prior art, and particularly, the technique obtains an image of a front side of a vehicle by using an outside camera for photographing a front side, analyzes the image of the front side of the vehicle, and recognizes whether an obstacle exists on a driving lane. In this case, it is impossible to detect whether a travelling vehicle, not an obstacle, moves, and particularly, it is impossible to help a driver to recognize a danger of an accident occurable when two or more vehicles (for example, vehicles travelling the first lane and the third lane) simultaneously change lanes toward the same lane (for example, the second lane) in advance.

SUMMARY

The present invention has been made in an effort to provide a method for assisting in a lane change, which calculates a danger of an accident based on an image photographed by a camera and notifies a driver of the danger of the accident in advance when two or more vehicles, which are travelling with one lane interposed therebetween, simultaneously change lanes toward the same lane, thereby enabling a driver of a vehicle to be safe according to a lane change before the driver actually changes the lane, and an apparatus for the same.

Objects of the present invention are not limited to the objects described above, and other objects that are not described will be clearly understood by a person skilled in the art from the description below.

An exemplary embodiment of the present invention provides an apparatus for assisting in a lane change, including: a driving information collecting unit configured to collect driving information about a first vehicle; an image generating unit configured to generate a driving image including a lateral side image of the first vehicle by using a camera; a line detecting unit configured to detect a line of a first lane adjacent to a driving lane of the first vehicle in the driving image; a lane change determining unit configured to determine whether the first vehicle attempts to change a lane from the driving lane to a first lane based on the driving information; and a danger determining unit configured to determine whether it is dangerous to change the lane to the first lane based on a change in a line of the first lane detected by the line detecting unit when it is determined that the first vehicle attempts to change the lane, and generate a danger notifying signal when it is determined that it is dangerous to change the lane to the first lane.

Another exemplary embodiment of the present invention provides a method of operating an apparatus for assisting in a lane change, including: generating a driving image including a lateral side image of a first vehicle by using a camera; detecting a line of a first lane adjacent to a driving lane of the first vehicle in the driving image; collecting driving information about the first vehicle; determining whether the first vehicle attempts to change a lane from the driving lane to a first lane based on the driving information about the first vehicle; determining whether it is dangerous to change the lane to the first lane based on a change in the line of the first lane when it is determined that the first vehicle attempts to change the lane; and generating a danger notifying signal when it is determined that it is dangerous to change the lane to the first lane.

Other detailed matters of the exemplary embodiments are included in the detailed description and the drawings.

According to the various exemplary embodiments of the present invention, when two or more vehicles, which are travelling with one lane interposed therebetween, simultaneously change lanes toward the same lane, it is possible to calculate a danger of an accident based on an image photographed by a camera and notify a driver of the danger of the accident in advance, thereby ensuring safe drying according to the lane change before the driver of the vehicle actually changes the lane.

Accordingly, it is possible to reduce cost necessary for manufacturing and maintaining a vehicle by utilizing the present invention as an additional function of an around view monitoring (AVM) system and a mirrorless device.

The effects of the present invention are not limited to the aforementioned effects, and other effects, which are not mentioned above, will be clearly understood by those skilled in the art from the claims.

DETAILED DESCRIPTION

Figure 1:
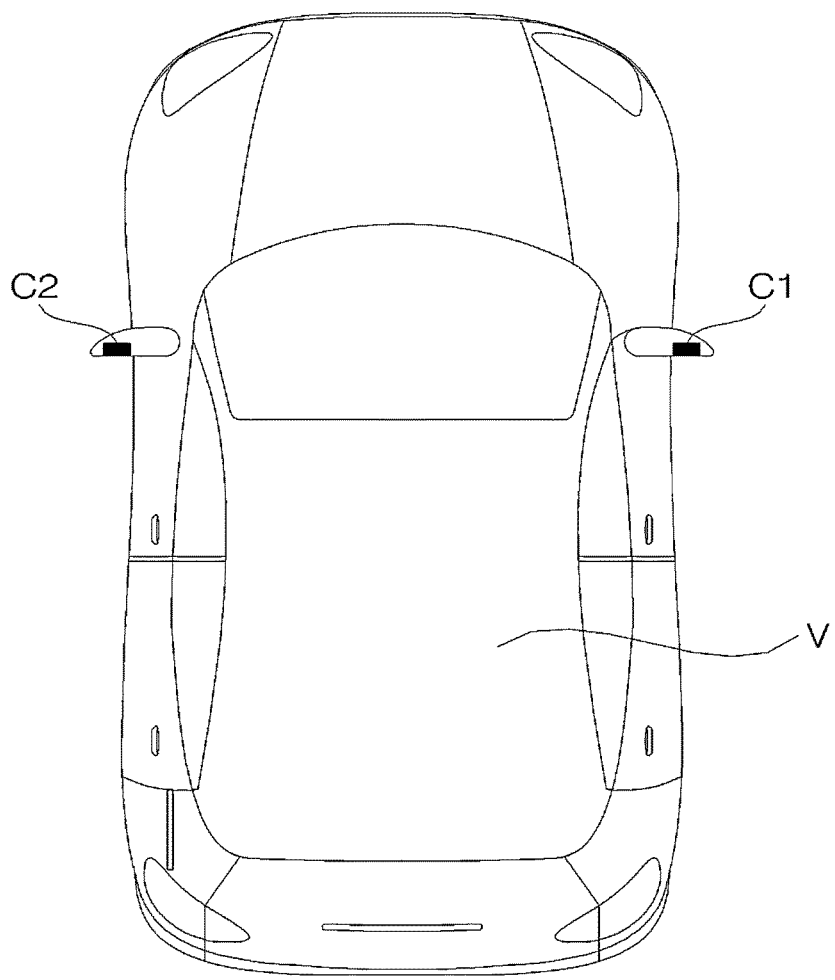
FIG. 1 is a diagram illustrating an example of a case where cameras are mounted in a vehicle according to an exemplary embodiment of the present invention.

Various advantages and features of the present invention and methods accomplishing thereof will become apparent from the following detailed description of exemplary embodiments with reference to the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

In the present specification, constituents, which have the same names, are divided into "the first", "the second", and the like for discriminating the constituents, but the present invention is not necessarily limited to the order in the following description.

Meanwhile, terms used in the present invention are to explain exemplary embodiments rather than limiting the present invention. Unless particularly stated otherwise in the present specification, a singular form also includes a plural form. The meaning of "comprises" and/or "comprising" used in this specification does not exclude the existence or addition of aforementioned constituent elements, steps, operations, and/or device, and one or more other constituent elements, steps, operations, and/or devices.

FIG. 1 is a diagram illustrating an example of a case where cameras are mounted in a vehicle according to an exemplary embodiment of the present invention.

Referring to FIG. 1, according to an exemplary embodiment of the present invention, a camera for photographing a physical space positioned in a predetermined range from a lateral side of a vehicle may be mounted at one side of the vehicle. FIG. 1 illustrates that cameras C1 and C2 are mounted at a left side mirror and a right side mirror of the vehicle, respectively, which is only one example, but the position of the camera mounted is not specifically limited as long as the camera is mounted at a position where the camera photographs a region including a lane adjacent to a driving lane $R_D$ of the vehicle and a line of the corresponding lane.

FIG. 1 illustrates that a total of two cameras C1 and C2 are mounted, but it should be understood that any one between the left camera and a right camera may be mounted, or more cameras may be mounted at other points of the vehicle. Hereinafter, the present invention will be described on an assumption that the camera is mounted at the right side of the vehicle to photograph a lateral side of the vehicle.

Figure 2:
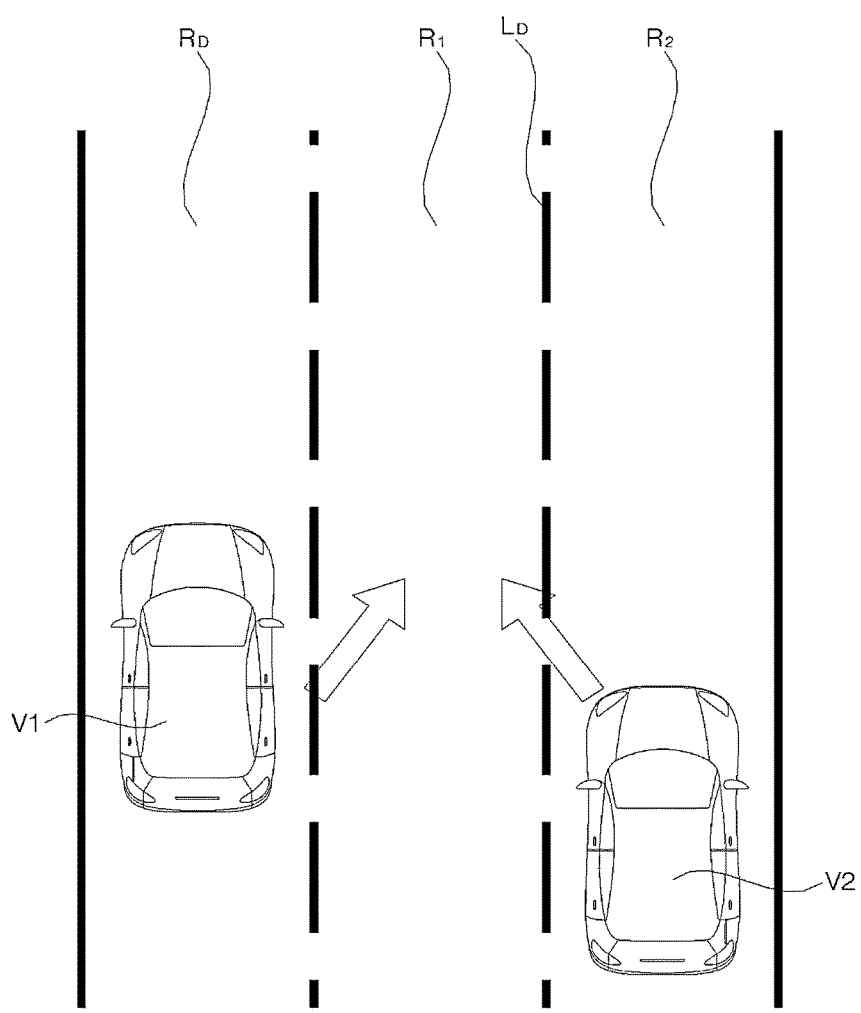
FIG. 2 is a diagram illustrating an example of a situation where two vehicles attempt to change lanes toward the same lane with one lane interposed therebetween while travelling.

FIG. 2 is a diagram illustrating an example of a situation where two vehicles attempt to change lanes toward the same lane with one lane interposed therebetween while travelling, and the present invention will be continuously described based on a first vehicle V1.

Referring to FIG. 2, the first vehicle V1 has the first lane from a left side as its own driving lane $R_D$, and attempts to change a lane toward the first lane $R_1$ that is the most adjacent lane while travelling. Further, a second vehicle V2 has a second lane $R_2$ that is the third lane from the left side as its own driving lane $R_D$, and simultaneously, attempts to change a lane toward the first lane $R_1$ together with the first vehicle V1 while travelling. Here, the second lane $R_2$ is a lane sharing a line $L_D$ with the first lane $R_1$.

According to the exemplary embodiments of the present invention, an object of the present invention is to provide an apparatus for preventing an accident between the first vehicle V1 and the second vehicle V2 occurable in the example illustrated in FIG. 2, and an operating method thereof, and detailed configurations and operations will be described with reference to FIGS. 3 to 8.

Figure 3:
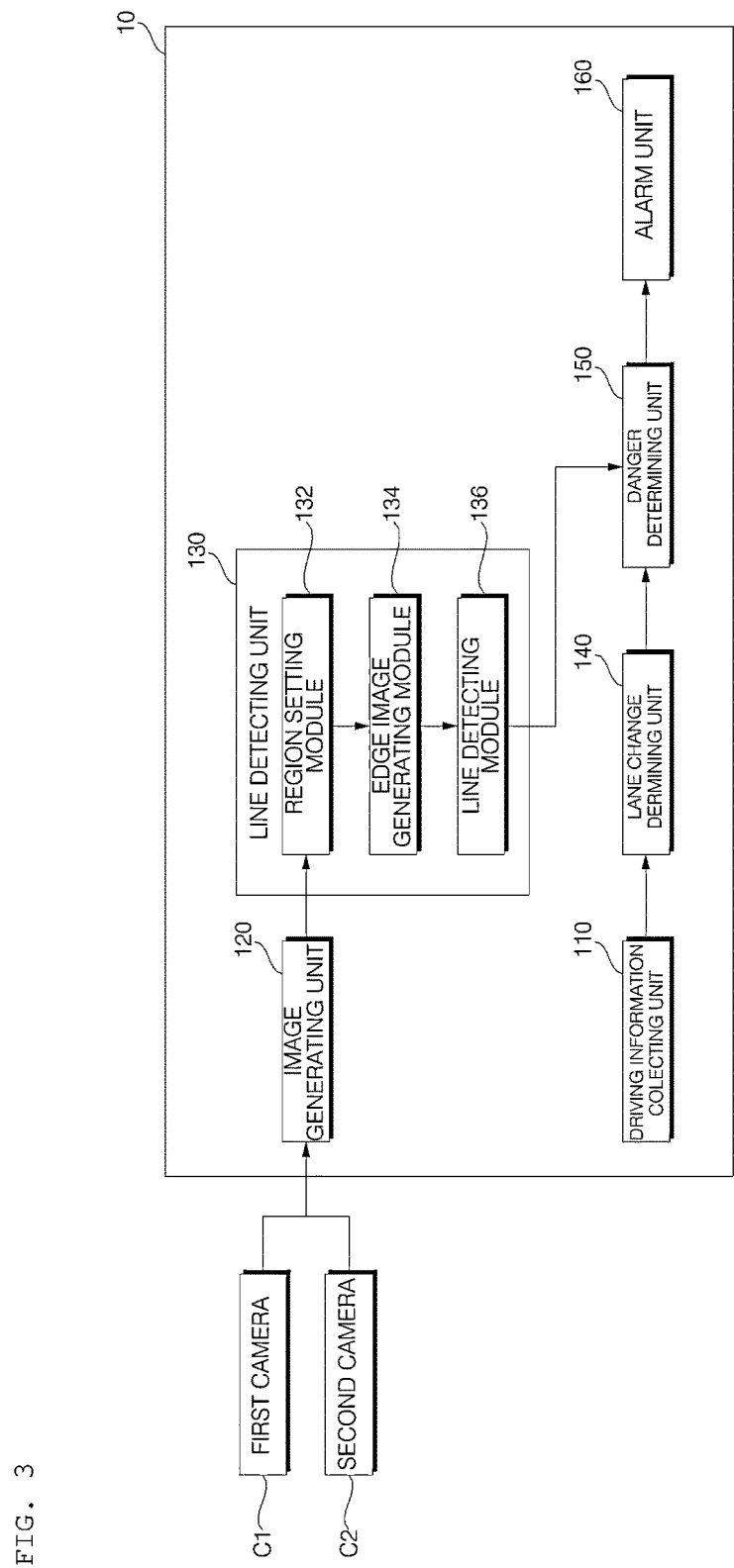
FIG. 3 is a block diagram of an apparatus for assisting in a lane change according to an exemplary embodiment of the present invention.
Figure 4:
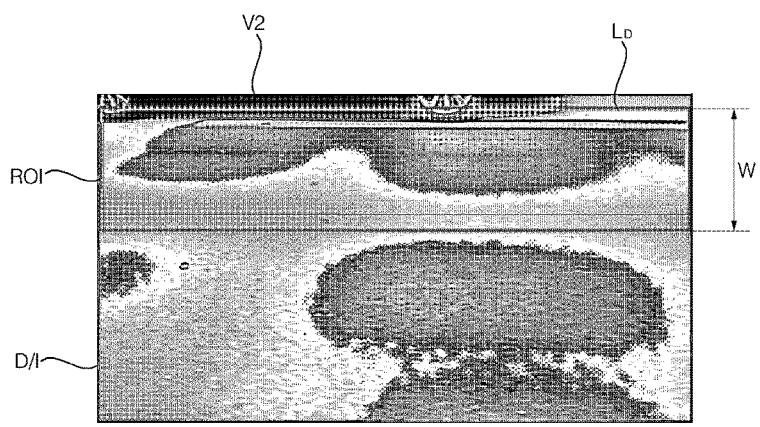
FIG. 4 is a diagram illustrating an example of a case where a region of interest is set according to an exemplary embodiment of the present invention.
Figure 5:
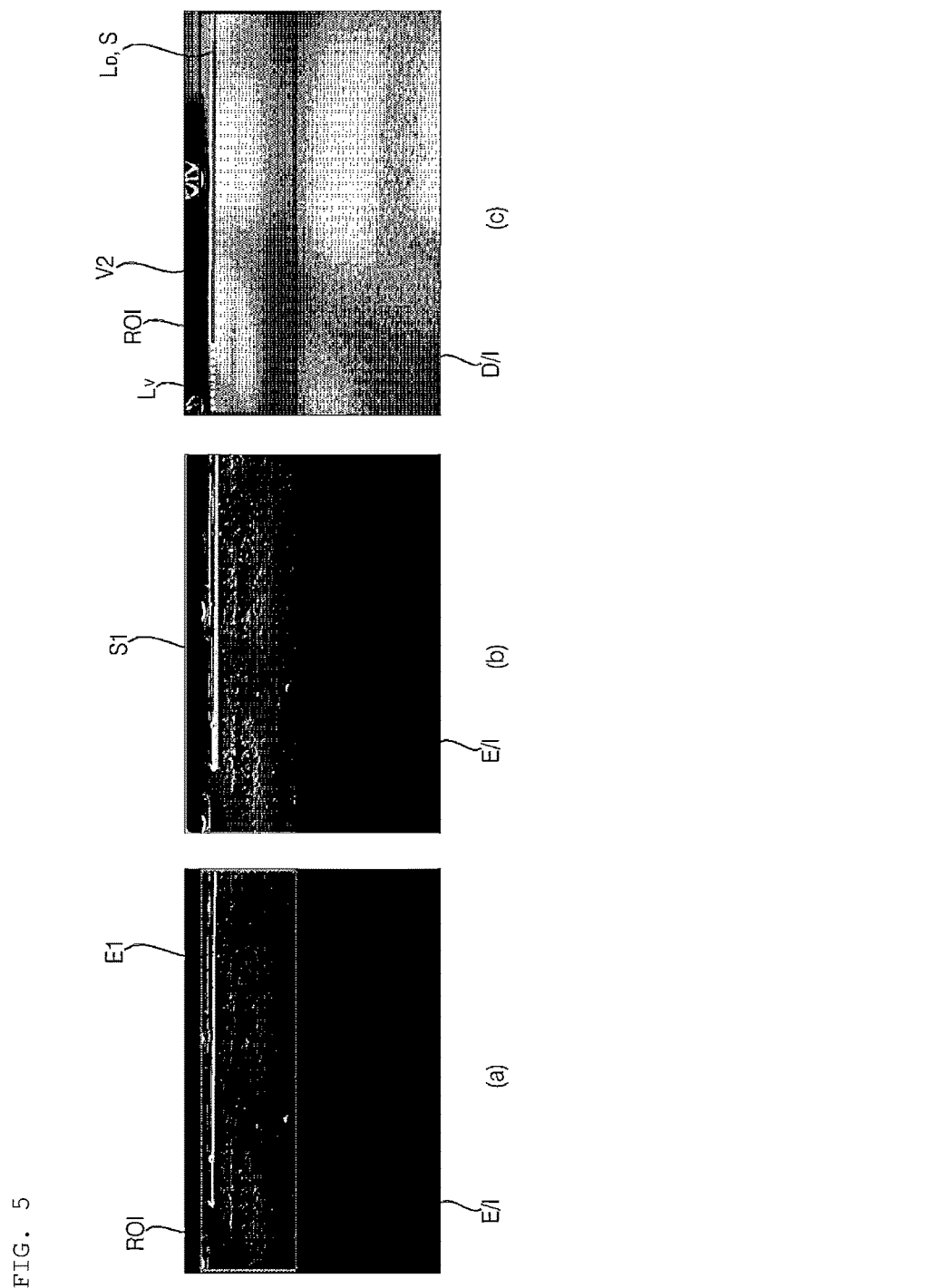
FIG. 5 is a diagram illustrating an example of a case where a straight line corresponding to a line is detected by processing the region of interest illustrated in FIG. 4.

FIG. 3 is a block diagram of an apparatus 10 for assisting in a lane change according to an exemplary embodiment of the present invention, FIG. 4 is a diagram illustrating an example of a case where a region of interest ROI is set according to an exemplary embodiment of the present invention, and FIG. 5 is a diagram illustrating an example of a case where a straight line corresponding to a line is detected by processing the region of interest ROI illustrated in FIG. 4.

Referring to FIG. 3, the apparatus 10 for assisting in a lane change according to an exemplary embodiment of the present invention includes a driving information collecting unit 110, an image generating unit 120, a line detecting unit 130, a lane change determining unit 140, and a danger determining unit 150. Further, the apparatus 10 for assisting in a lane change may further include an alarm unit 160.

First, the driving information collecting unit 110 collects driving information about the first vehicle V1. Particularly, the driving information may include movement direction information, or turn signal light operation information.

For example, when a driver operates a steering wheel in a clockwise direction, the driving information collecting unit 110 may collect information indicating that the first vehicle V1 moves in a right direction, and when the driver operates the steering wheel in a counterclockwise direction, the driving information collecting unit 110 may collect information indicating that the first vehicle V1 moves in a left direction.

For another example, when a signal directing turning on a turn signal light mounted at the left side of the first vehicle V1 is generated, the driving information collecting unit 110 collects information indicating that the first vehicle V1 may move in the left direction, and when a signal directing turning on a turn signal light mounted at the right side of the first vehicle V1 is generated, the driving information collecting unit 110 collects information indicating that the first vehicle V1 may move in the right direction.

The driving information collecting unit 110 may collect speed information about the first vehicle V1. The speed information about the first vehicle V1 collected by the driving information collecting unit 110 may be utilized for setting a size of a region of interest ROI to be described below.

The image generating unit 120 generates a driving image including a lateral side image of the first vehicle V1 by using a camera mounted in the first vehicle V1. In the meantime, the driving image generated by the image generating unit 120 by using each camera mounted in the first vehicle V1 may be formed by a plurality of frames created for every predetermined time interval.

Referring to FIG. 4, it can be confirmed a driving image D/I including a right side image of the first vehicle V1 generated by using a camera C1 mounted at the right side of the first vehicle V1. The driving image D/I includes a wheel of the second vehicle V2 and a part of a monitoring line $L_D$ that is the line of the first lane $R_1$.

The lane change determining unit 140 determines whether the first vehicle V1 attempts to change a lane from the driving lane $R_D$ to the first lane $R_1$ based on the driving information. More particularly, the lane change determining unit 140 receiving the driving information about the first vehicle V1 from the driving information collecting unit 110 determines whether the first vehicle V1 attempts to change the lane from the driving lane $R_D$ to the first lane (that is, the left lane or the right lane which is most adjacent to the driving lane) at a time point, at which the driving information is provided, by analyzing the driving information.

For example, when the lane change determining unit 140 receives information indicating that the first vehicle V1 moves in the right direction from the driving information collecting unit 110, the lane change determining unit 140 determines that the first vehicle V1 attempts to change the lane to the right lane between the two lanes which are most adjacent to the current driving lane $R_D$.

The line detecting unit 130 detects a monitoring line $L_D$ that is the line of the first lane $R_1$ adjacent to the driving lane $R_D$ of the first vehicle V1 in the driving image. The line detecting unit 130 may include a region setting module 132, an edge image generating module 134, and a line detecting module 136.

The region setting module 132 sets a region, which includes the monitoring line $L_D$ and has a predetermined width W, as a region of interest ROI. Referring to FIG. 4, the region setting module 132 sets the region of interest ROI that is a region necessary for detecting a lane change of the second vehicle V2 in the entire region of the driving image. The region of interest ROI may be set so as to include the line $L_D$ of the first lane $R_1$ within the driving image D/I. Further, in order to rapidly and accurately determine a probability of an accident with the second vehicle V2, the region setting module 132 may control so that a region corresponding to a predetermined ratio (for example, 1/4 time) or more of a predetermined lane width toward the first vehicle V1 from the monitoring line $L_D$ is included in the region of interest ROI.

The region setting module 132 may receive the driving information from the driving information collecting unit 110, and adjust a size of the region of interest ROI based on the driving information. For example, when a speed of the first vehicle V1 is 100 km per hour, the region setting module 132 may increase a size of the region of interest ROI compared to the case where a speed of the first vehicle V1 is 50 km per hour. The reason is that when a speed of the vehicle is great, a region, in which an accident with another vehicle may occur, is increased.

The edge image generating module 134 generates an edge image E/I for the region including the region of interest ROI set by the region setting module 132. Referring to FIG. 5A, it can be seen that a first contour line E1 is detected from the driving image illustrated in FIG. 4. Referring to FIG. 4, those skilled in the art may easily recognize that the first contour line E1 illustrated in FIG. 5A corresponds to the monitoring line $L_D$. The edge image may be generated by using a publicly known method, such as a sobel edge detection algorithm, such that a detailed description thereof will be omitted.

The line detecting module 136 calculates an equation of a straight line for one or more contour lines including the first contour line E1 that is a contour line corresponding to a predetermined line shape within the edge image E/I generated by the edge image generating module 134. FIG. 5A illustrates only the single first contour line E1 for convenience of the description.

The line detecting module 136 may calculate a size of the contour line, and perform line fitting so as to correspond to the calculated size. Thus, as illustrated in FIG. 5B, the line detecting module 136 may calculate a straight line S1 approximated to the first contour line E1.

In the meantime, referring to FIG. 4, it can be seen that a disconnected region exists at a part of the left side of the monitoring line $L_D$, and thus the first straight line for the monitoring line $L_D$ calculated by the line detecting module 136 does not have a part of the left side thereof as illustrated in FIG. 5B.

Accordingly, the line detecting module 136 may confirm whether a disconnected region exists in the first contour line E1 of the edge image. For example, a larger disconnected region than the monitoring line $L_D$ illustrated in FIG. 4 may exist, or in a severe case, all of the monitoring line $L_D$ may be temporarily removed or a hidden road region may exist. When the disconnected region exists in the first contour line E1, the line detecting module 136 may generate a virtual line $L_V$ interpolating the disconnected region by using the equation of the straight line for the first contour line E1.

The line detecting module 136 may generate the virtual line $L_V$ based on a past history in which information about the equation of the straight line of the first contour line E1 is accumulated by a predetermined number of times. For example, in the case where an inclination of the equation of the straight line of the first contour line E1 is calculated as 1 in an N-$3^{rd}$ frame, 1.1 in an N-$2^{nd}$ frame, and 1.2 in an N-$1^{st}$ frame, when the equation of the straight line of the first contour line is updated by accumulating a past history for the aforementioned three frames even though the monitoring line $L_D$ is not detected in an $N^{th}$ frame that is a current frame, the line detecting module 136 may interpolate the disconnected region by generating the virtual line $L_V$ by estimating the equation of the straight line of the first contour line E1 in the $N^{th}$ frame.

Accordingly, even though the monitoring line $L_D$ has a form of a dotted line indicating a road on which a lane change is allowed, it is possible to more accurately detect whether the second vehicle V2, which changes the lane from the second lane $R_2$ to the first lane $R_1$, exists.

In the meantime, the line detecting module 136 may determine whether a second contour line E2, which is a different contour line from the first contour line E1, exists as a contour line corresponding to the line in the edge image E/I, and calculate an equation of a straight line for the second contour line E1, so that a detailed operation thereof will be described with reference to FIG. 6.

Figure 6:
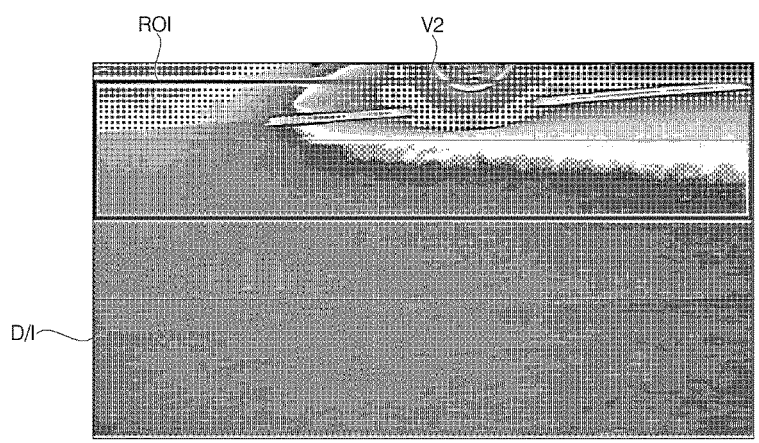
FIG. 6 is a diagram illustrating an example of a driving image displayed when two vehicles, which are travelling with one lane interposed therebetween, attempt to change lanes toward the same lane.
Figure 7:
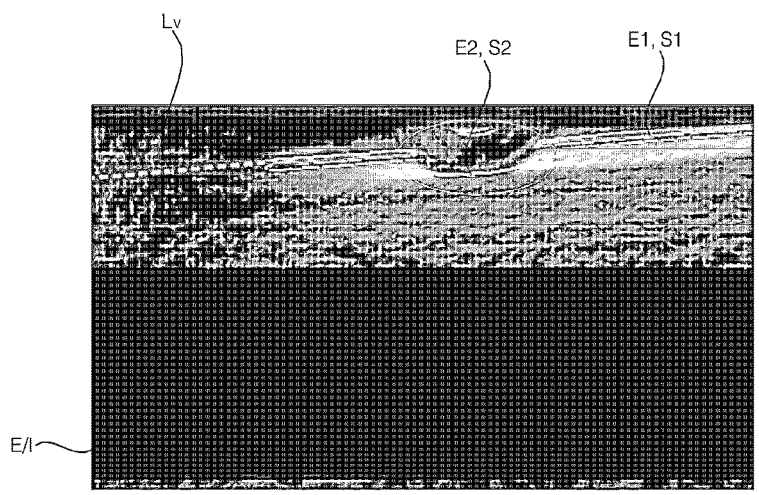
FIG. 7 is a diagram illustrating an example of a contour line detected according to processing of the driving image illustrated in FIG. 6.

FIG. 6 is a diagram illustrating an example of a driving image displayed when two vehicles, which are travelling with one lane interposed therebetween, attempt to change lanes toward the same lane, and FIG. 7 is a diagram illustrating an example of a contour line detected according to processing of the driving image illustrated in FIG. 6.

First, referring to FIG. 6, differently from FIG. 4, it can be seen that a wheel of the second vehicle V2 deviates from the monitoring line $L_D$ at one side of the region of interest ROI set by the region setting module 132 according to a movement of the second vehicle V2 toward the first vehicle V1 from the second lane $R_2$.

When a driving image D/I generated in the situation illustrated in FIG. 6 is analyzed, an edge image E/I illustrated in FIG. 7 may be generated. Referring to FIG. 7, it can be confirmed a situation where a part of the monitoring line $L_D$ is hidden by the wheel of the second vehicle V2, so that a disconnected region is generated in the first contour line E1 in a region corresponding to a hidden part, and simultaneously a part, at which the vehicle of the second vehicle V2 is in contact with a ground, is detected as the second contour line E2. Accordingly, the line detecting module 136 may calculate an equation S2 of a straight line for the second contour line E2 by the same method as that of calculating an equation S1 of a straight line for the first contour line E1.

The danger determining unit 150 determines whether the first contour line E1 and the second contour line E2 are simultaneously detected by the line detecting module 136. Here, the first contour line E1 may be related to the actual monitoring line $L_D$, and the second contour line E2 may be related to the second vehicle V2 which may be erroneously recognized as the monitoring line $L_D$. The case where only one between the first contour line E1 and the second contour line E2 is detected is the case where at least one vehicle between the first vehicle V1 and the second vehicle V2 does not attempt to change the lane, so that the case may be excluded from a situation of generating a danger notifying signal.

When the first contour line E1 and the second contour line E2 are simultaneously detected in the single edge image, the danger determining unit 150 may compare the equation of the straight line for the first contour line E1 and the equation of a straight line for the second contour line E2, and calculate an inclination difference or an intercept difference.

When each of the inclination and the intercept is equal to or greater than a predetermined threshold value as a result of the calculation of the inclination difference or the intercept difference, the danger determining unit 150 may generate the danger notifying signal. When the inclination difference or the intercept difference between the equation of the straight line for the first contour line E1 and the equation of the straight line for the second contour line E2 is calculated to be equal to or greater than the predetermined threshold value, it cannot be processed as the inclination difference or the intercept difference is calculated from the same monitoring line $L_D$.

By contrast, when it is determined that the inclination difference or the intercept difference is smaller than the predetermined threshold value, the danger determining unit 150 may determine whether a disconnected region, which is continuously detected for a predetermined time or longer, exists in one or more disconnected regions detected by the line detecting module 136.

In general, a line allowing the lane change has a form of a dotted line. In a normal line having the form of a dotted line, a frame configuring the driving image is continuously generated according to the travelling of the vehicle in a front direction, so that a process, in which a specific disconnected region disappears and another disconnected region appears, needs to be performed.

When the same disconnected region is continuously detected for a predetermined time or in a predetermined number or more of frames in the disconnected regions detected by the line detecting module 136, the disconnected region may be detected for a part of another vehicle, not the line in the form of the dotted line. For example, referring to FIG. 7, the reason is that when the second vehicle V2 deviates from the monitoring line $L_D$ and enters the first lane while travelling at a speed similar to that of the first vehicle V1, a disconnected region generated in the first contour line by a part (for example, a wheel) of the second vehicle V2 may be continuously detected for a predetermined time or in a plurality of frames.

Accordingly, when the disconnected region is continuously detected for the predetermined time or in the predetermined number or more of frames, the danger determining unit 150 may generate the danger notifying signal.

When the alarm unit 160 receives the danger notifying signal from the danger determining unit 150, the alarm unit 160 outputs an alert corresponding to the danger notifying signal. The alarm unit 160 may include one or more output devices, such as a display module, a sound module, or a haptic module, for outputting a danger according to the lane change so that the driver may recognize the danger. For example, when the alarm unit 160 receives the danger notifying signal, the alarm unit 160 makes a control so that a beep repeated at a predetermined cycle is output through a sound module, a message in a text form is displayed on a display module, or a vibration having a predetermined pattern is generated by a haptic module.

Figure 8:
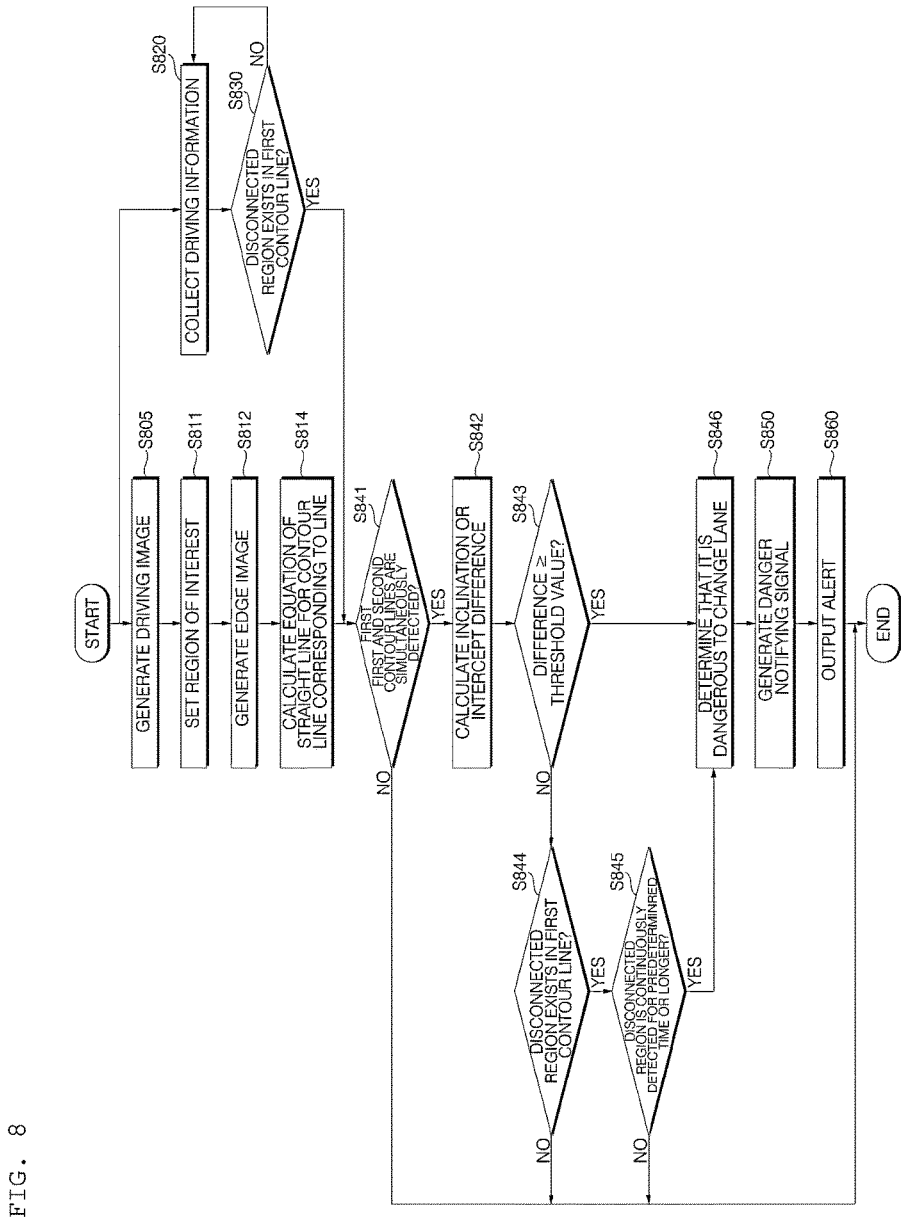
FIG. 8 is a flowchart illustrating an operating method of the apparatus for assisting in a lane change according to the exemplary embodiment of the present invention.

FIG. 8 is a flowchart illustrating an operating method of the apparatus for assisting in a lane change according to the exemplary embodiment of the present invention.

Referring to FIG. 8, the image generating unit 120 generates a driving image D/I including a lateral side image of a first vehicle V1 by using a camera (S805).

Next, the line detecting unit 130 detects a line of a first lane adjacent to a driving lane $R_D$ of the first vehicle V1 in the driving image D/I (S810). Particularly, operation S810 may include setting a region, which includes the line of the first lane and has a predetermined width, as a region of interest ROI (S811), generating an edge image E/I for the region including the region of interest ROI (S812), and calculating an equation of a straight line for one or more contour lines including a first contour line E1 that is a contour line corresponding to the line within the edge image E/I (S814).

In the meantime, the driving information collecting unit 110 collects driving information about the first vehicle V1 (S820). Operation S820 may be performed after operation S805 or S810 is completed. Otherwise, it should be understood that operation S820 may be simultaneously performed with operation S805 or S810. When operation S820 is completed, the lane change determining unit 140 determines whether the first vehicle V1 attempts to change a lane from the driving lane $R_D$ to a first lane $R_1$ based on the driving information about the first vehicle V1 (S830). When it is determined in operation S830 that the first vehicle V1 does not attempt to change the lane from the driving lane $R_D$ to a first lane $R_1$, the method may return to operation S820.

Next, the danger determining unit 150 determines whether it is dangerous to change the lane to the first lane based on a change in a line of the first lane (S840). Particularly, in operation S840, the danger determining unit 150 may determine whether the first contour line E1 and a second contour line E2 are simultaneously detected (S841), when the first contour line E1 and the second contour line E2 are simultaneously detected, the danger determining unit 150 may compare an equation of a straight line for the first contour line E1 and an equation of a straight line for the second contour line E2 and calculate an inclination difference or an intercept difference (S842), and determine whether the calculated inclination difference or intercept difference is equal to or greater than a predetermined threshold value (S843).

When the inclination difference or the intercept difference is equal to or greater than the predetermined threshold value as a result of the determination in operation S843, the danger determining unit 150 may determine that it is dangerous to change the lane to the first lane $R_1$ (S846).

However, when the inclination difference or the intercept difference is smaller than the predetermined threshold value as a result of the determination in operation S843, the danger determining unit 150 determines whether one or more disconnected regions exist in the first contour line E1 (S844) before performing operation S846, and when one or more disconnected regions exist in the first contour line E as a result of the determination, the danger determine unit 150 may additionally determine whether the disconnected region continuously detected for a predetermined time or longer exists in the disconnected regions (S845). As a result of the determination in operation S845, when the disconnected region continuously detected for the predetermined time or longer exists, the aforementioned operation S846 may be performed.

Next, the danger determining unit 150 generates a danger notifying signal (S850). The danger notifying signal may be a signal for notifying a driver of the first vehicle V1 that it is presently dangerous to change the lane to the first lane $R_1$.

Next, the alarm unit 160 outputs an alert corresponding to the danger notifying signal (S860). For example, when the alarm unit 160 receives the danger notifying signal, the alarm unit 160 makes a control so that a beep repeated at a predetermined cycle is output through a sound module, a message in a text form is displayed on a display module, or a vibration having a predetermined pattern is generated by a haptic module.

The above-mentioned exemplary embodiments of the present invention are not embodied only by an apparatus and a method. Alternatively, the above-mentioned exemplary embodiments may be embodied by a program executing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

In the present invention, various substitutions, modifications, and changes can be made within the scope without departing from the technical spirit of the present invention by those skilled in the art, and as a result, the present invention is not limited to the aforementioned embodiments and the accompanying drawings, but the entirety or a part of the respective exemplary embodiments may be selectively combined and implemented for various modifications.

What is claimed is:

1. An apparatus for assisting in a lane change, comprising:
   a camera mounted on a driving vehicle and configured to photograph a common line shared by a first neighboring lane and a second neighboring lane at a lateral side of the driving vehicle while the driving vehicle moves on a driving lane, the first neighboring lane being positioned between the driving lane and the second neighboring lane; and
   circuitry mounted on the driving vehicle and configured to:
   collect driving information about the driving vehicle,
   generate a driving image including a part of the first neighboring lane and the common line photographed by the camera,
   detect the common line shared by the first neighboring lane and the second neighboring lane in the driving image,
   determine whether the driving vehicle attempts to change a lane on which the driving vehicle moves from the driving lane to the first neighboring lane based on the driving information,
   determine whether a neighboring vehicle moving on the second neighboring lane is changing a lane on which the neighboring vehicle moves from the second neighboring lane to the first neighboring lane, by analyzing the common line in the driving image, and
   determine whether it is dangerous for the driving vehicle to change the lane on which the driving vehicle moves from the driving lane to the first neighboring lane based on a determination whether the neighboring vehicle is changing the lane on which the neighboring vehicle moves from the second neighboring lane to the first neighboring lane, and generate a danger notifying signal when it is determined that it is dangerous for the driving vehicle to change the lane on which the driving vehicle moves from the driving lane to the first neighboring lane.

2. The apparatus of claim 1, further comprising:
   an alarm unit configured to output an alert in response to the danger notifying signal when receiving the danger notifying signal, wherein the alarm unit includes at least one of a displaying device, a speaker, and a haptic module which generates a vibration having a predetermined pattern.

3. The apparatus of claim 1, wherein the driving information includes movement direction information or turn signal light operation information about the driving vehicle.

4. The apparatus of claim 1, wherein the circuitry is further configured to:
   set a region, which includes the common line and has a predetermined width, as a region of interest;
   generate an edge image for the region of interest; and
   calculate an equation of a straight line for one or more contour lines including a first contour line that is a contour line corresponding to the common line within the edge image.

5. The apparatus of claim 4, wherein the circuitry is further configured to make a control such that a region corresponding to ¼ or more of a predetermined lane width toward the driving vehicle from the common line is included in the region of interest.

6. The apparatus of claim 4, wherein when a disconnected region exists in the first contour line, the circuitry generates a virtual line for interpolating the disconnected region by using the equation of the straight line for the first contour line.

7. The apparatus of claim 6, wherein the circuitry is further configured to generate the virtual line based on a past history in which information about the equation of the straight line of the first contour line is accumulated by a predetermined number of times.

8. The apparatus of claim 4, wherein when a second contour line, which is a different contour line from the first contour line, exists as a contour line corresponding to the common line in the edge image, the circuitry calculates an equation of a straight line for the second contour line.

9. The apparatus of claim 8, wherein the circuitry determines whether the first contour line and the second contour line are simultaneously detected.

10. The apparatus of claim 9, wherein, when the first contour line and the second contour line are simultaneously detected, the circuitry compares the equation of the straight line for the first contour line and the equation of the straight line for the second contour line, and calculates an inclination difference or an intercept difference.

11. The apparatus of claim 10, wherein when the inclination difference or the intercept difference is equal to or greater than a predetermined threshold value, the circuitry generates the danger notifying signal.

12. The apparatus of claim 10, wherein when the inclination difference or the intercept difference is smaller than the predetermined threshold value, the circuitry determines whether a disconnected region, which is continuously detected for a predetermined time or longer, exists in the one or more disconnected regions detected, and when the disconnected region, which is continuously detected for the predetermined time or longer, exists, the circuitry generates the danger notifying signal.

13. A method of operating an apparatus for assisting in a lane change, comprising:
photographing, using a camera mounted on a driving vehicle, a common lane shared by a first neighboring lane and a second neighboring lane at a lateral side of the driving vehicle while the driving vehicle moves on a driving lane, the first neighboring lane being positioned between the driving lane and the second neighboring lane;
generating, by circuitry mounted on the driving vehicle, a driving image including a part of the first neighboring lane and the common line photographed by the camera;
detecting, by the circuitry, the common line shared by the first neighboring lane and the second neighboring lane in the driving image;
collecting, by the circuitry, driving information about the driving vehicle;
determining, by the circuitry, whether the driving vehicle attempts to change a lane on which the driving vehicle moves from the driving lane to a first neighboring lane based on the driving information about the driving vehicle;
determining, by the circuitry, whether a neighboring vehicle moving on the second neighboring lane is changing a lane on which the neighboring vehicle moves from the second neighboring lane to the first neighboring lane, by analyzing the common line in the driving image;
determining, by the circuitry, whether it is dangerous for the driving vehicle to change the lane on which the driving vehicle moves from the driving lane to the first neighboring lane based on a determination whether the neighboring vehicle is changing the lane on which the neighboring vehicle moves from the second neighboring lane to the first neighboring lane; and
generating, by the circuitry, a danger notifying signal when it is determined that it is dangerous for the driving vehicle to change the lane on which the driving vehicle moves from the driving lane to the first neighboring lane.

14. The method of claim 13, further comprising:
outputting an alert in response to the danger notifying signal, wherein the alert includes at least one of a message displayed by a display device, a beep sound output by a speaker, and a vibration having a predetermined pattern and generated by a haptic module.

15. The method of claim 13, wherein the detecting, by the circuitry, the common line includes:
setting a region, which includes the common line and has a predetermined width, as a region of interest;
generating an edge image for the region of interest; and
calculating an equation of a straight line for one or more contour lines including a first contour line that is a contour line corresponding to the common line within the edge image.

16. The method of claim 15, wherein the calculating of the equation of the straight line includes calculating an equation of a straight line for a second contour line, which is a different contour line from the first contour line, as a contour line corresponding to the common line in the edge image.

17. The method of claim 16, wherein the determining, by the circuitry, whether it is dangerous for the driving vehicle to change the lane on which the driving vehicle moves from the driving lane to the first neighboring lane includes:
determining whether the first contour line and the second contour line are simultaneously detected;
when the first contour line and the second contour line are simultaneously detected, comparing the equation of the straight line for the first contour line and the equation of the straight line for the second contour line, and calculating an inclination difference or an intercept difference; and
determining whether the inclination difference or the intercept difference is equal to or greater than a predetermined threshold value.

18. The method of claim 17, wherein the determining, by the circuitry, whether it is dangerous for the driving vehicle to change the lane on which the driving vehicle moves from the driving lane to the first neighboring lane includes determining that it is dangerous for the driving vehicle to change the lane on which the driving vehicle moves from the driving lane to the first neighboring lane when the inclination difference or the intercept difference is equal to or greater than the predetermined threshold value.

19. The method of claim 17, wherein the determining, by the circuitry, whether it is dangerous for the driving vehicle to change the lane on which the driving vehicle moves from the driving lane to the first neighboring lane further includes:
determining whether one or more disconnected regions exist in the first contour line when the inclination difference or the intercept difference is smaller than the predetermined threshold value; and determining whether a disconnected region, which is continuously detected for a predetermined time or longer, exists in the disconnected regions, and when the disconnected region, which is continuously detected for the predetermined time or longer, exists, it is determined that it is dangerous for the driving vehicle to change the lane on which the driving vehicle moves from the driving lane to the first neighboring lane.

\* \* \* \* \*